(12) United States Patent
Takahashi

(10) Patent No.: US 11,673,453 B2
(45) Date of Patent: Jun. 13, 2023

(54) FIXED WINDOW GLASS HAVING RESIN FRAME BODY, AND METHOD FOR MANUFACTURING SAME

(71) Applicant: AGC Inc., Tokyo (JP)

(72) Inventor: Kazuhiro Takahashi, Tokyo (JP)

(73) Assignee: AGC INC., Tokyo (JP)

(*) Notice: Subject to any disclaimer, the term of this patent is extended or adjusted under 35 U.S.C. 154(b) by 389 days.

(21) Appl. No.: 16/891,608

(22) Filed: Jun. 3, 2020

(65) Prior Publication Data

US 2020/0290436 A1    Sep. 17, 2020

Related U.S. Application Data

(63) Continuation of application No. PCT/JP2018/042344, filed on Nov. 15, 2018.

(30) Foreign Application Priority Data

Dec. 12, 2017    (JP) .............................. JP2017-237585

(51) Int. Cl.
*B60J 5/04* (2006.01)
*B60J 10/76* (2016.01)
(Continued)

(52) U.S. Cl.
CPC ................. *B60J 1/007* (2013.01); *B60J 1/17* (2013.01); *B60J 5/0402* (2013.01); *B60J 10/76* (2016.02)

(58) Field of Classification Search
CPC ... B60J 10/70; B60J 10/78; B60J 10/16; B60J 10/10; B60J 10/265; B60J 10/76; B60J 1/007; B60J 1/17; B60J 5/0402
See application file for complete search history.

(56) References Cited

U.S. PATENT DOCUMENTS 4,761,916 A * 8/1988 Sanok ................. B29C 33/0072
                                              296/147
5,139,307 A * 8/1992 Koops ..................... B60J 10/78
                                              52/208
(Continued)

FOREIGN PATENT DOCUMENTS

JP    H06-32214 U    4/1994
JP    2003-011157 A    1/2003
(Continued)

OTHER PUBLICATIONS

English translation for WO2005/092655 (Year: 2005).*
(Continued)

*Primary Examiner* — Justin B Rephann
(74) *Attorney, Agent, or Firm* — Foley & Lardner LLP

(57) ABSTRACT

A fixed window glass assembly with a resin frame, wherein the resin frame is attached to a peripheral edge portion of a fixed window glass to be mounted to a vehicle and has a guide portion for guiding an elevating window glass, the resin frame is formed of an integrally molded product including a harder portion and a softer portion covering the harder portion, the harder portion being formed in a U-character shape in section to wrap the peripheral edge portion of the fixed window glass in a thickness direction thereof. The harder portion includes a buffer portion at a part of the peripheral edge portion of the fixed window glass to buffer stresses to be generated between the fixed window glass and the resin frame.

16 Claims, 7 Drawing Sheets

(51) Int. Cl.
  *B60J 1/00* (2006.01)
  *B60J 1/17* (2006.01)

(56) References Cited

U.S. PATENT DOCUMENTS

| | | | | |
|---|---|---|---|---|
| 5,338,087 | A * | 8/1994 | Gross | B60J 10/70 52/204.591 |
| 5,915,780 | A * | 6/1999 | Kobrehel | B60J 10/70 52/208 |
| 6,024,906 | A * | 2/2000 | Cook | B29C 48/154 264/177.2 |
| 6,257,644 | B1 * | 7/2001 | Young | B60J 10/70 296/93 |
| 6,293,609 | B1 * | 9/2001 | Xu | B60J 1/10 52/204.591 |
| 6,810,635 | B2 * | 11/2004 | Meizlish | B60J 10/35 52/716.5 |
| 8,505,262 | B2 * | 8/2013 | Senge | B60J 10/265 52/716.5 |
| 11,267,325 | B2 * | 3/2022 | Yu | B29C 45/14434 |
| 2001/0034976 | A1 * | 11/2001 | Maass | B60J 10/24 49/441 |
| 2010/0001550 | A1 * | 1/2010 | Janisch | B60J 10/78 296/146.2 |
| 2012/0144751 | A1 * | 6/2012 | Schapitz | B60J 10/265 49/431 |
| 2012/0167473 | A1 * | 7/2012 | Schapitz | B60J 10/30 49/431 |
| 2012/0256447 | A1 * | 10/2012 | Majer | B60J 10/70 296/201 |
| 2015/0017368 | A1 * | 1/2015 | Kondou | B29C 45/1671 428/38 |
| 2015/0165884 | A1 * | 6/2015 | Lee | B60J 10/76 49/504 |
| 2015/0298531 | A1 | 10/2015 | Liu | |
| 2018/0119478 | A1 * | 5/2018 | Lahnala | E06B 3/5454 |
| 2018/0119479 | A1 * | 5/2018 | Jerrim | B60J 1/004 |

FOREIGN PATENT DOCUMENTS

| | | |
|---|---|---|
| JP | 2012-066753 A | 4/2012 |
| JP | 6134010 B2 | 5/2017 |
| WO | WO-2005/092655 A1 | 10/2005 |

OTHER PUBLICATIONS

International Searching Authority, "International Search Report," issued in connection with International Patent Application No. PCT/JP2018/042344, dated Jan. 8, 2019.

International Searching Authority, "Written Opinion," issued in connection with International Patent Application No. PCT/JP2018/042344, dated Jan. 8, 2019.

* cited by examiner

FIXED WINDOW GLASS HAVING RESIN FRAME BODY, AND METHOD FOR MANUFACTURING SAME

CROSS-REFERENCE TO RELATED PATENT APPLICATIONS

This application is a continuation of PCT Application No. PCT/JP2018/042344, filed on Nov. 15, 2018, which is based upon and claims the benefit of priority from Japanese Patent Application No. 2017-237585 filed on Dec. 12, 2017. The contents of those applications are incorporated herein by reference in their entireties.

TECHNICAL FIELD

The present invention relates to a fixed window glass assembly with a resin frame, and a process for manufacturing the same.

BACKGROUND ART

As a window glass to be mounted to a vehicle door, there are an elevating window glass and a non-elevating, fixed window glass. When an elevating window glass and a fixed window glass are disposed to be adjacent to each other, it is known that a frame surrounding an edge of the fixed window glass and a guide portion for guiding the lifting and lowering movement of the elevating window glass are disposed to be connected together.

Patent Document 1 listed below discloses a quarter window glass assembly which includes a quarter window glass as a fixed window glass, an encapsulation as a resin frame surrounding an edge of the quarter window glass, and a guide rail connected to the encapsulation, and a process for manufacturing the same.

In the manufacturing process disclosed in Patent Document 1, the quarter window glass and the guide rail are separately prepared, and both of them are set in a mold. The mold has a cavity formed as designed according to the shape of the encapsulation. The cavity is filled with an encapsulation material, and the encapsulation material is solidified to form the encapsulation while the quarter window glass and the guide rail are connected together.

PRIOR ART DOCUMENTS

Patent Documents

Patent Document 1: Japanese Patent No. 6134010

DISCLOSURE OF INVENTION

Technical Problem

In Patent Document 1, it is, however, concerned that the connection between the quarter window glass and the guide rail may be insufficient. When the encapsulation is made of a resin, the encapsulation shrinks when being solidified. It is concerned that stresses are generated by the shrinkage to crack the quarter window glass or deform the quarter window glass by the stresses, changing the surface accuracy of the quarter window glass.

The present invention is proposed in consideration of these problems. It is an object of the present invention to provide a fixed window glass assembly with a resin frame, which is capable of firmly connecting a guide portion and a fixed window glass and of buffering stresses generated between the resin frame and the fixed window glass, and a process for manufacturing the same.

Solution to Problem

The present invention encompasses the modes described below:

The fixed window glass assembly with a resin frame according to the present invention includes a resin frame, which is attached to a peripheral edge portion of a fixed window glass to be mounted to a vehicle and has a guide portion for guiding an elevating window glass, the resin frame being formed of an integrally molded product including a harder portion and a softer portion covering the harder portion, the harder portion being formed in a U-character shape in section to wrap the peripheral edge portion of the fixed window glass in a thickness direction thereof, and the harder portion including a buffer portion at a part of the peripheral edge portion of the fixed window glass to buffer stresses to be generated between the fixed window glass and the resin frame.

The process for manufacturing the fixed window glass assembly with a resin frame according to the present invention, wherein the resin frame is integrally molded to a peripheral edge portion of a fixed window glass to be mounted to a vehicle and includes a guide portion for guiding an elevating window glass, includes a first forming process of forming a harder portion in a U-character shape in section to wrap a peripheral edge portion of the fixed window glass in a thickness direction thereof and including a buffer portion partly in the peripheral edge portion of the fixed window glass to buffer stresses to be generated between the fixed window glass and the resin frame; and a second forming process of forming a softer portion in a U-character shape in section so as to cover the harder portion.

Advantageous Effects of Invention

In accordance with the present invention, it is possible not only to firmly connect a guide portion and a fixed window glass but also to buffer stresses generated between a resin frame and the fixed window glass, minimizing the occurrence of crack or deformation in the fixed window glass.

DESCRIPTION OF EMBODIMENTS

Now, embodiments of the present invention will be described in reference to the accompanying drawings. Numerous modifications and changes can be made to the embodiments without departing from the scope of the present invention, and these modifications and changes are encompassed by the present invention.

In Description, the wordings of "upward", "downward", "interior", "exterior", "vertical" and "horizontal", which are indicative of directions or positions, mean upper, lower, interior, exterior, vertical and horizontal directions or positions when a fixed window glass assembly with a resin frame is mounted to a vehicle.

Figure 1:
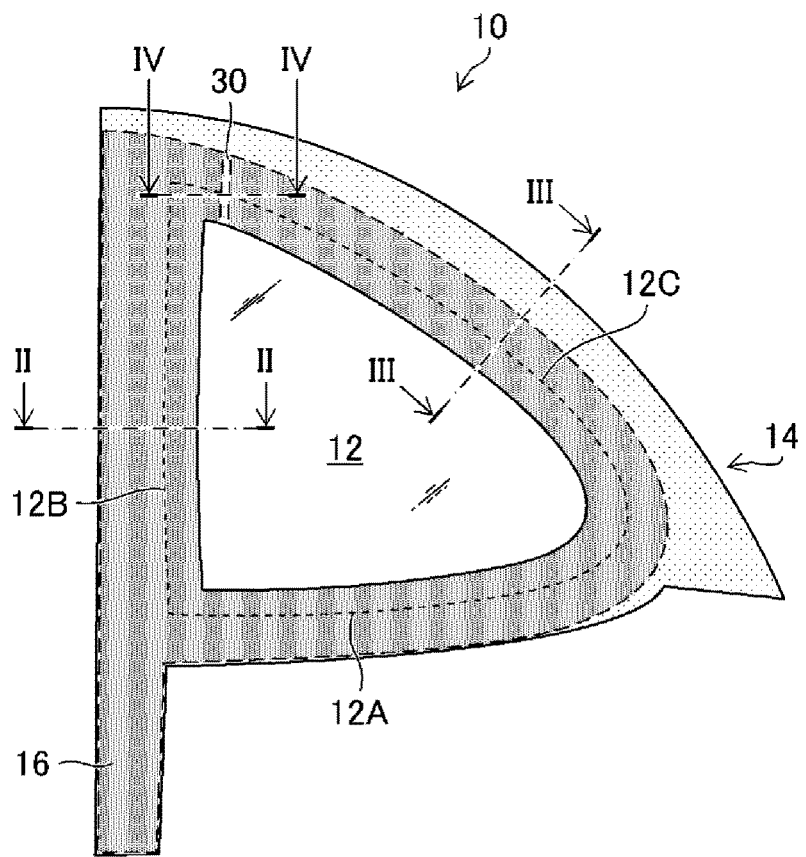
FIG. 1 is a schematic front view of the fixed window glass assembly with a resin frame according to an embodiment of the present invention.

The fixed window glass assembly with a resin frame 10 illustrated in FIG. 1 is to be assembled to a side door of a vehicle (not shown) in a fixed state so as not to be elevating. The fixed window glass assembly with a resin frame 10 is to be mounted to, for example, a rear door so as to be adjacent to an elevating window glass (not shown). The elevating window glass is coupled to a lifting device (not shown) disposed in a door panel and is moved upward and downward by a driving force given by the lifting device.

The embodiments will be described about an example where the fixed window glass assembly with a resin frame 10 includes a fixed window glass 12 formed of a single glass plate. The fixed window glass 12 is formed in a substantially triangular shape as seen in a front view and includes a horizontal portion 12A, a vertical portion 12B and a hypotenuse portion 12C. The hypotenuse portion 12C is configured to extend in a curved manner, not a linear manner. It should be noted that the fixed window glass 12 is not limited to be formed in such a shape. The horizontal portion 12A may extend in a horizontal or substantially horizontal manner, and the vertical portion 12B may extend in a vertical or substantially vertical manner.

As illustrated in FIG. 1, the fixed window glass assembly with a resin frame 10 according to the illustrated embodiment includes a resin frame 14, which is attached to a peripheral edge portion of the fixed window glass 12. The resin frame 14 is disposed along the horizontal portion 12A, the vertical portion 12B and the hypotenuse portion 12C of the fixed window glass 12.

The resin frame 14 has a guide portion 16 formed therein so as to extend along the vertical portion 12B and beyond the horizontal portion 12A. When the adjacent elevating window glass is moved upward and downward, the elevating window glass is guided by the guide portion 16.

Figure 2:
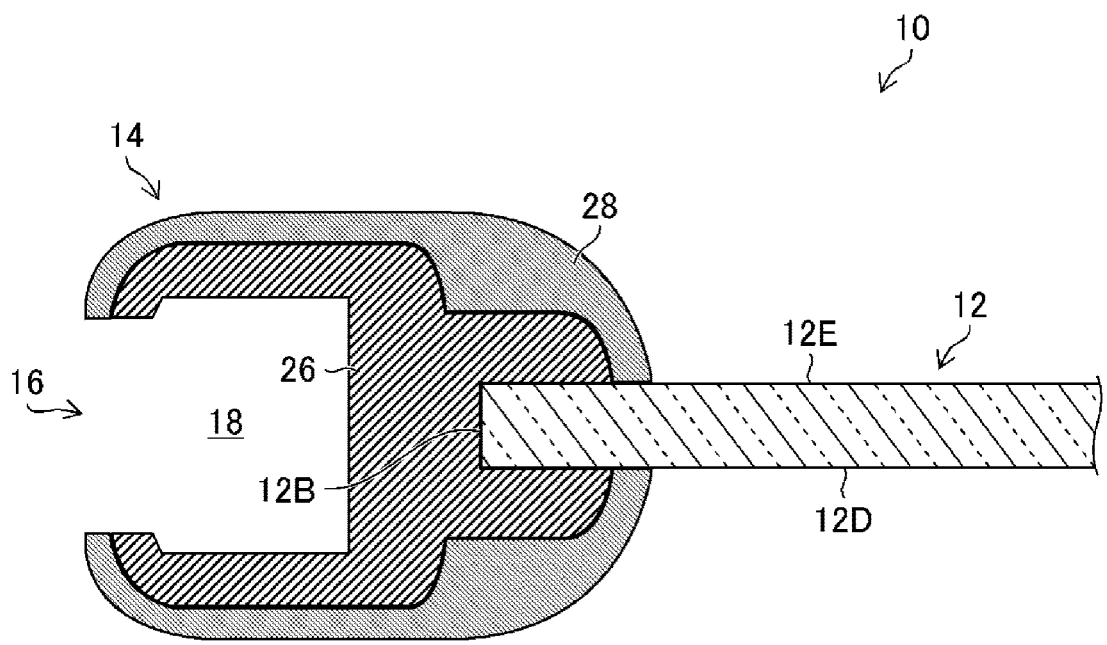
FIG. 2 is a schematic cross-sectional view taken along line II-II of FIG. 1.

As illustrated in FIG. 2, the resin frame 14 is an integrally molded product formed of a harder portion 26 and a softer portion 28. The harder portion 26 is formed in a U-character shape in section to wrap the peripheral edge portion of the fixed window glass 12 in a thickness direction thereof. The U-character shape includes a substantially U-character shape. The harder portion 26 confronts a first surface 12D and a second surface 12E of the fixed window glass 12. The resin frame 14 includes the softer portion 28, which covers an exterior surface of the harder portion 26.

In the illustrated embodiment, the harder portion 26 wraps the fixed window glass 12 in the thickness direction and surrounds almost the entire peripheral edge portion to prevent the fixed window glass 12 from being detached from the resin frame 14.

As illustrated in FIG. 2, the guide portion 16 is configured by a channel 18, which is disposed on a side of the harder portion 26 opposite to the fixed window glass 12, extends along a lifting or lowering direction of the elevating window glass and is formed in a U-character shape in section. In the illustrated embodiment, the guide portion 16 is integrally formed with the harder portion 26 wrapping the fixed window glass 12 to firmly couple the fixed window glass 12 and the guide portion 16 without the guide 16 being detached from the fixed window glass 12. Since the guide portion 16 is formed of the harder potion 26, the elevating window glass can be reliably guided when the elevating window glass is moved upward and downward.

Since the softer portion 28 covers the exterior surface of the harder portion 26, the softer portion 28 can ensure the sealing property that is obtained when the fixed window glass assembly with a resin frame 10 is mounted to a vehicle.

The material forming the harder portion 26 may be a thermoplastic elastomer made of, for example, PP (polypropylene) or PVC (polyvinyl chloride) with fibers, such as glass fibers or carbon fibers, being contained therein.

The material forming the harder portion 26 may be a thermoplastic elastomer made of, for example, PP (polypropylene) or PVC (polyvinyl chloride) without fibers, such as glass fibers or carbon fibers, being contained therein.

The resin frame 14 is preferred to be a two-color molded product, which is made by forming the harder portion 26, followed by forming the softer portion 28 to finish the resin frame 14. From this point of view, the material forming the harder portion 26 is preferred to be made of PP or PVC which is a base material (main material) common to the harder portion 26 and the softer portion 28 in consideration of integral molding property (adhesiveness) with the softer portion 28. For example, it is preferred to use a combination where the harder portion 26 is made of PP containing glass fibers while the softer portion 28 is made of a thermoplastic elastomer including a base material of PP containing no glass fibers.

The hardness of the harder portion 26 is preferably 70 to 130, more preferably 100 to 120 in Rockwell hardness. The softer portion 28 has a hardness of preferably 50 to 98, more preferably 60 to 80 in Type A prescribed in JIS K6253 (corresponding to ISO7619, ISO868 and ASTM D2240).

It is preferred to dispose an unshown primer layer between the harder potion 26 and the peripheral edge portion of the fixed window glass 12 in contact with the harder portion 26. The primer layer may be disposed on all three parts or at least one part among a part of the first surface 12D of the fixed window glass 12 in contact with the harder portion 26, a part of the second surface 12E of the fixed window glass 12 in contact with the harder portion 26, and an end surface 12B of the fixed window glass 12. The primer layer may be disposed by applying a primer. The primer layer can increase the adhesiveness between the harder portion 26 and the fixed window glass 12. From the viewpoint of preventing water, such as rainwater, from flowing on and along an exterior side of the resin frame 14 to come from an exterior side in an interior side of the vehicle, it is preferred to dispose the primer layer on an exterior side of the fixed window glass 12. The primer may be made by mixing one kind or at least two kinds of polyurethane-based, polyester-based, polyimide-based, phenol-based, acrylic, epoxy-based, cyanoacrylate-based or rubber-based adhesives.

Figure 3:
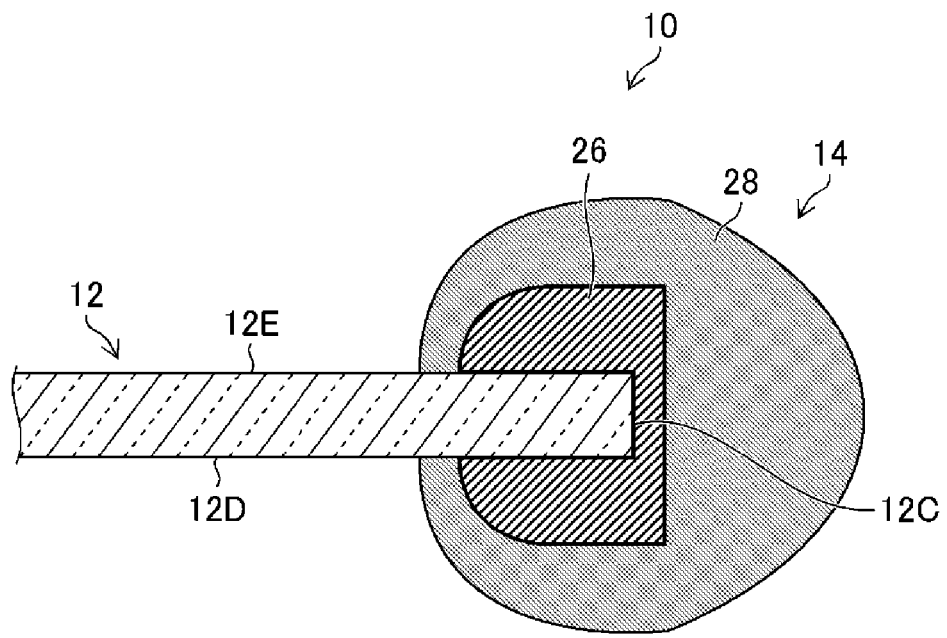
FIG. 3 is a schematic cross-sectional view taken along line III-III of FIG. 1.

As illustrated in FIG. 3, the resin frame 14 is an integrally molded product formed of the harder portion 26 and the softer portion 28 in the same manner to that illustrated in FIG. 2. At a position illustrated in FIG. 3, a part of the resin frame 14 along the hypotenuse portion 12C includes no guide portion 16 as illustrated in FIG. 3.

As illustrated in FIG. 1, the harder portion 26 of the resin frame 14 has a buffer portion 30 partly formed therein so as to buffer stresses generated between the fixed window glass 12 and the resin frame 14.

As described above, the harder portion 26 forming the resin frame 14 is disposed on the peripheral edge portion of the fixed window glass 12 so as to surround almost the entire peripheral edge portion of the fixed window glass 12. By this arrangement, the harder portion 26 is heat-shrunk during forming the resin frame 14 or by an environmental change, such as temperature cycles. Stresses generated between the fixed window glass 12 and the resin frame 14 are applied toward substantially the center of the fixed window glass 12. This causes concern that the fixed window glass 12 could be cracked or deformed.

Figure 4:
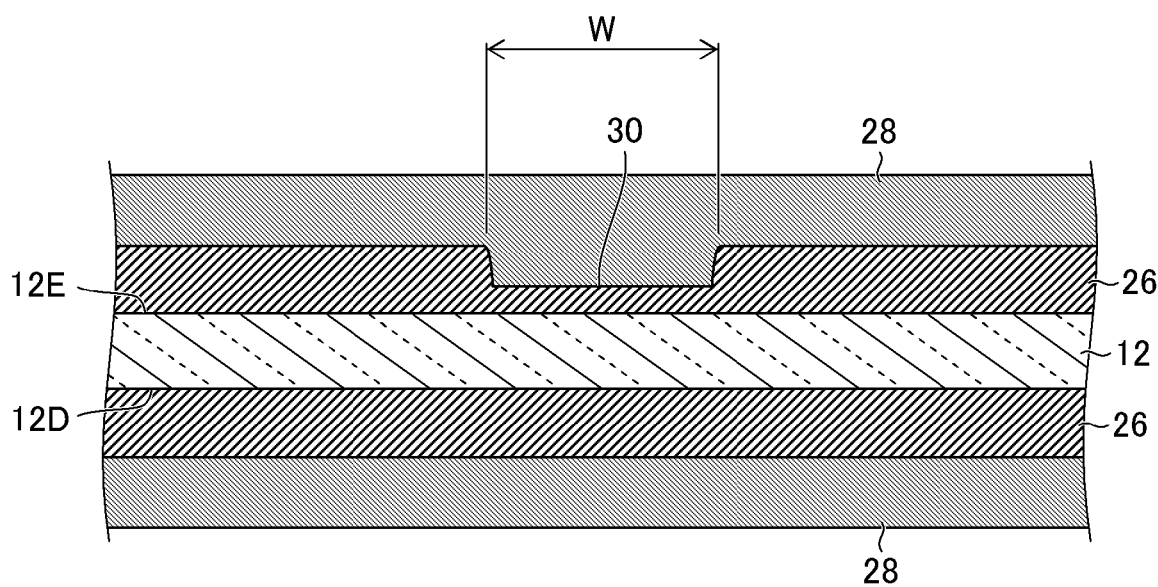
FIG. 4 is a schematic cross-sectional view taken along line IV-IV of FIG. 1.

As illustrated in FIG. 4, the buffer portion 30 is formed of, for example, a thin-walled portion formed partly in the harder portion 26. The harder portion 26 has a lower strength than the remaining parts of the harder portion 26. When the harder portion 26 is heat-shrunk, the buffer portion 30 is deformed to buffer stresses before the fixed window glass 12 is cracked. The buffer portion 30 can prevent the fixed window glass 12 from being cracked. The buffer portion 30 as the thin-walled portion is filled with the softer portion 28, and the softer portion 28 covers the harder portion 26 including the buffer portion 30. The buffer portion 30 as the thin-walled portion has a width W of preferably 0.5 mm to 10.0 mm. The width W of the buffer portion 30 as the thin-walled portion means the width of the widest part of the thin-walled portion. In order to form the thin-walled portion, it is necessary to use a mold having a projection. The projection of the mold has a width of preferably at least 1.0 mm in consideration of durability, and the width of the projection corresponds to the width W of the buffer portion 30. When the width W is excessively large, the amount of the softer portion 28 filled in the buffer portion 30 as the thin-walled portion increases. In such a case, it is concerned that the softer portion 28 could have a surface subjected to the occurrence of a recess (sink mark) when the softer portion 28 solidifies. The width W is preferred to be at most 3.0 mm.

Figure 5:
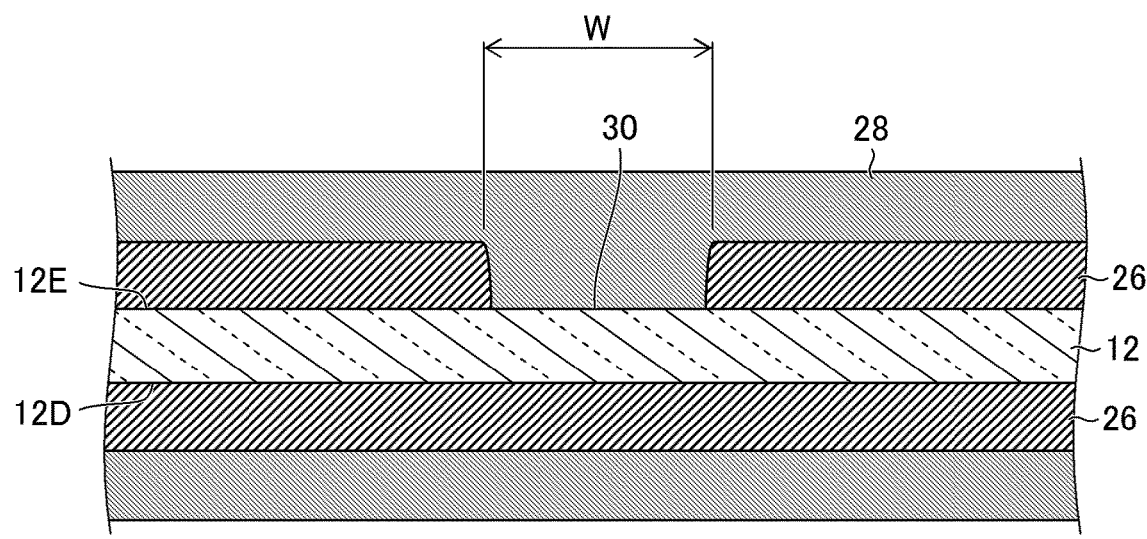
FIG. 5 is a cross-sectional view of the buffer portion according to another embodiment of the present invention.

As illustrated in FIG. 5, the buffer portion 30 is formed of a through groove formed partly in the harder portion 26 in another embodiment. The harder portion 26 is not formed on the fixed window glass 12 in the buffer portion 30 formed of the through groove, such that the fixed window glass 12 is exposed from the harder portion 26 at the buffer portion. In other words, the harder portion 26 is absent at the buffer portion 30. When the harder portion 26 is heat-shrunk, the harder portion 26 is deformed in a direction to spread the buffer portion 30 in order to buffer stresses before the fixed window glass 12 is cracked. The buffer portion 30 as the through groove is filled with the softer portion 28, and the softer portion 28 covers the harder portion 26 including the buffer portion 30. The buffer portion 30 has a width W of preferably 0.5 mm to 10.0 mm. When the buffer portion 30 is formed of the through groove, there is no limitation to the size of the width W. In order to form the through groove, it is necessary to use a mold having a projection. The projection of the mold has a width of preferably at least 1.0 mm in consideration of durability, and the width of the projection corresponds to the width W of the buffer portion 30. When the width W is excessively large, the amount of the softer portion 28 filled in the buffer portion 30 as the through groove increases. In such a case, it is concerned that the softer portion 28 could have a surface subjected to the occurrence of a recess (sink mark) when the softer portion 28 solidifies. The width W is preferred to be at most 3.0 mm.

The buffer portion 30 formed of the thin-walled portion or the through groove is preferred to be formed in a trapezoidal, rectangular or triangular shape as seen in section as illustrated in FIG. 5. It should be noted that the buffer portion is not limited to have any one of such shapes. The shape of the buffer portion 30 means the shape of a space with the harder potion being absent therein. When the buffer portion is formed in a trapezoidal or triangular shape as seen in section, the buffer portion is preferred to gradually spread in a direction away from the surface of the fixed window glass 12. Thus, it becomes easy to release a mold when the space with the harder potion being absent therein is formed by the projection of the mold.

There is no particular limitation to the position and the number of the buffer portion 30 formed in the harder portion 26. The buffer portion 30 is preferred to be formed in an area that cannot be observed from outside when the fixed window glass assembly with a resin frame 10 is mounted to a vehicle. If a recess is formed in a part of the softer portion 28 formed in the buffer portion 30 as described above, it is concerned that the fixed window glass assembly with a resin frame 10 could have a degraded appearance or design property. For example, the buffer portion 30 is preferred to be disposed on an interior side of the fixed window glass 12. The buffer portion 30 is preferred to be disposed outside an area of the harder portion 26 that serves as the guide portion 16. The reason is that the guide portion 16 is required to have some degree of strength in order to guide an elevating window glass.

Figure 6:
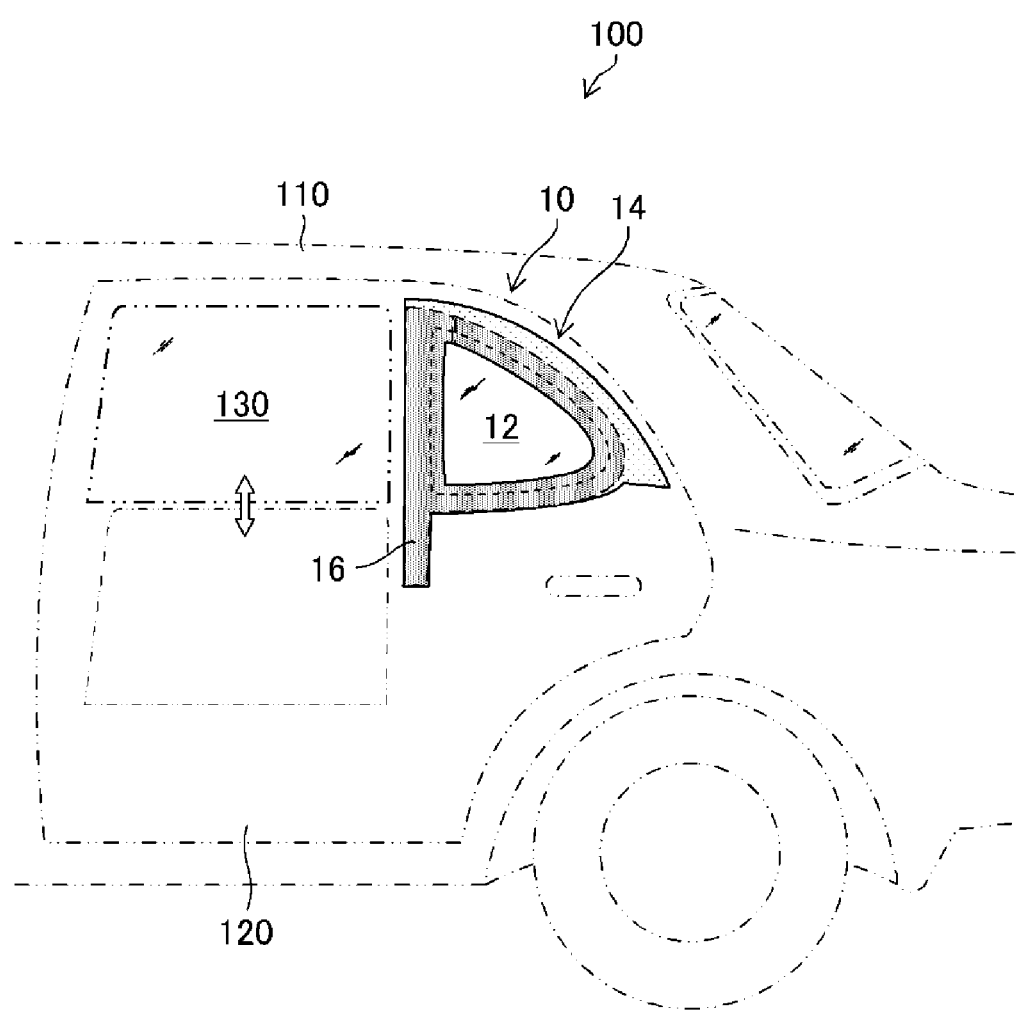
FIG. 6 is a schematic view of a rear side door equipped with the fixed window glass assembly with a resin frame.

As illustrated in FIG. 6, a rear side door 100 has a door panel 120 to be installed in a vehicle body 110, and a sash disposed on top of the door panel. The door panel 120 and the sash define a window glass opening. The fixed window glass assembly with a resin frame 10 and an elevating window glass 130 are mounted to the window glass opening. The fixed window glass assembly with a resin frame 10 is secured to the door panel 120 and the sash. The door panel 120 has a lifting device (not shown) disposed therein to move the elevating window glass 130 in a lifting or lowering direction (vertical direction of the vehicle).

The lifting device is driven to lift or lower the elevating window glass 130 with the elevating window glass being guided in the guide portion 16 of the fixed window glass assembly with a resin frame 10. Thus, the window glass opening is opened and closed by the elevating window glass 130.

Now, the process for manufacturing the fixed window glass assembly with a resin frame 10 according to an embodiment of the present invention will be described in reference to the flow chart illustrated in FIG. 7. The manufacturing process according to this embodiment is a manufacturing process for attaching the resin frame 14 to the fixed window glass 12 by two-color molding.

Figure 7:
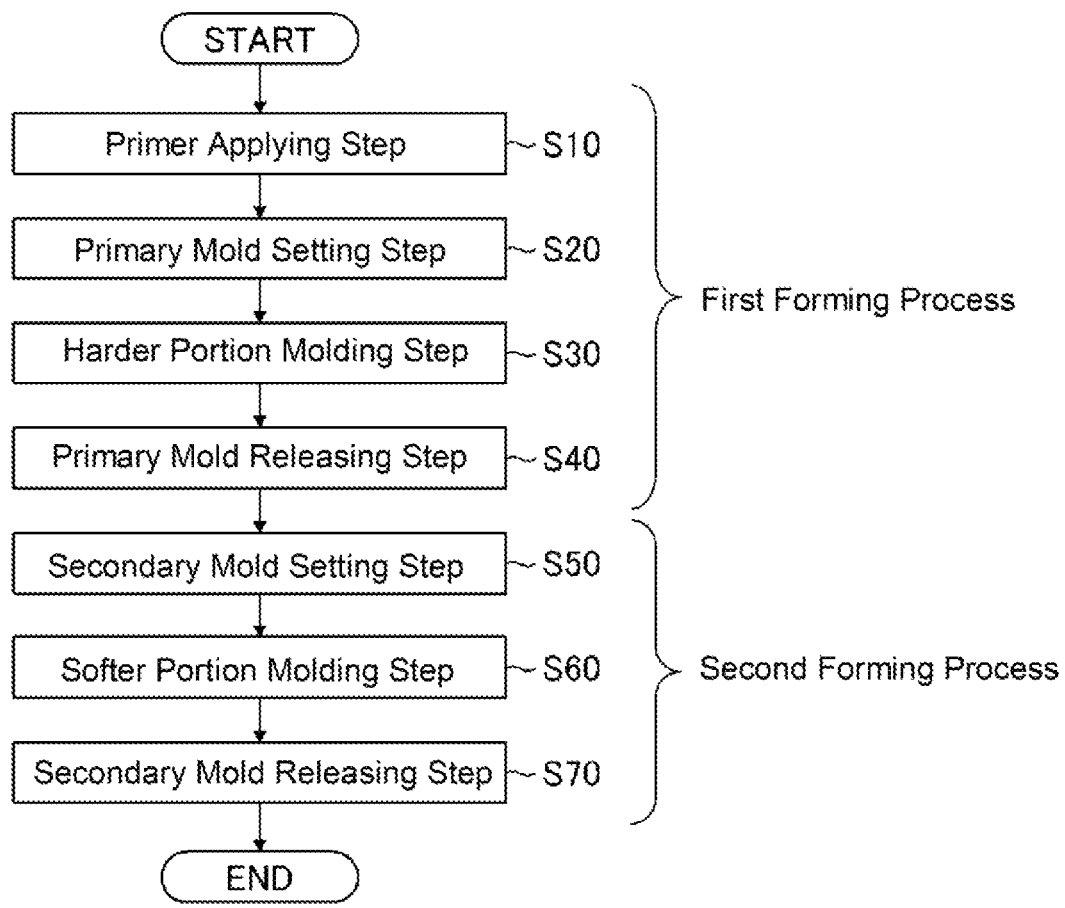
FIG. 7 is a flow chart illustrating an example of the process for manufacturing the fixed window glass assembly with a resin frame.

As illustrated in FIG. 7, the manufacturing process according to this embodiment is largely divided into a first forming process and a second forming process.

The first forming process includes a primer applying step (S10), a primary mold setting step (S20) of setting a primary mold for the harder portion to the fixed window glass 12, a harder portion molding step (S30) of injecting a molten resin for the harder portion into the primary mold, and a primary mold releasing step (S40) of releasing the primary mold from the fixed window glass 12 in the order of steps.

In the first forming process (S10), a primer is applied onto an area of the peripheral edge portion of the fixed window glass 12 where the harder portion 26 is to be formed.

Figure 8:
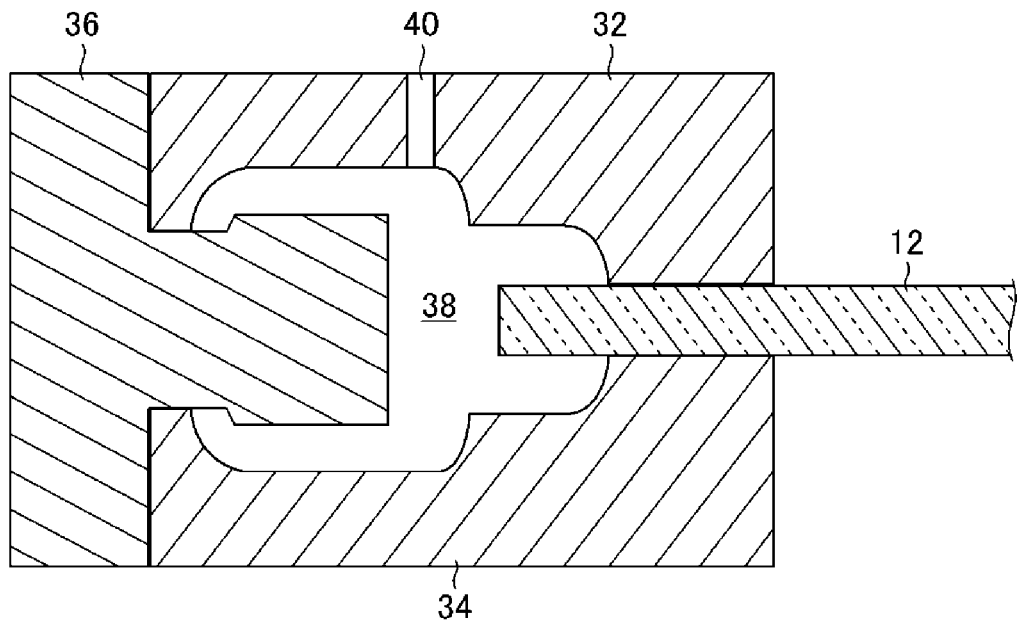
FIG. 8 is a view illustrating a primary mold setting step.

In FIG. 8 is illustrated a cross-sectional view wherein mold parts 32, 34 and 36 forming the primary mold are set at equipping positions with respect to the fixed window glass 12 for molding the resin frame 14. As illustrated in FIG. 8, a cavity space 38 is defined by inner wall surfaces of the mold parts 32, 34 and 36 to form the harder portion 26 and the groove 18 serving as the guide portion 16. The mold part 32 has a gate 40 for injecting the molten resin into the cavity space 38. Although not illustrated, the projection to form the buffer portion 30 is formed on at least one of the mold parts 32 and 34. The cavity space is narrow at a position where the projection is present. The mold part 36 is used to provide the harder portion 26 with the groove 18 as the guide portion 16. Although illustration has been made about an example where the mold parts 32, 34 and 36 form the primary mold, the structural example of the primary mold is not limited to one illustrated in FIG. 8.

Figure 9:
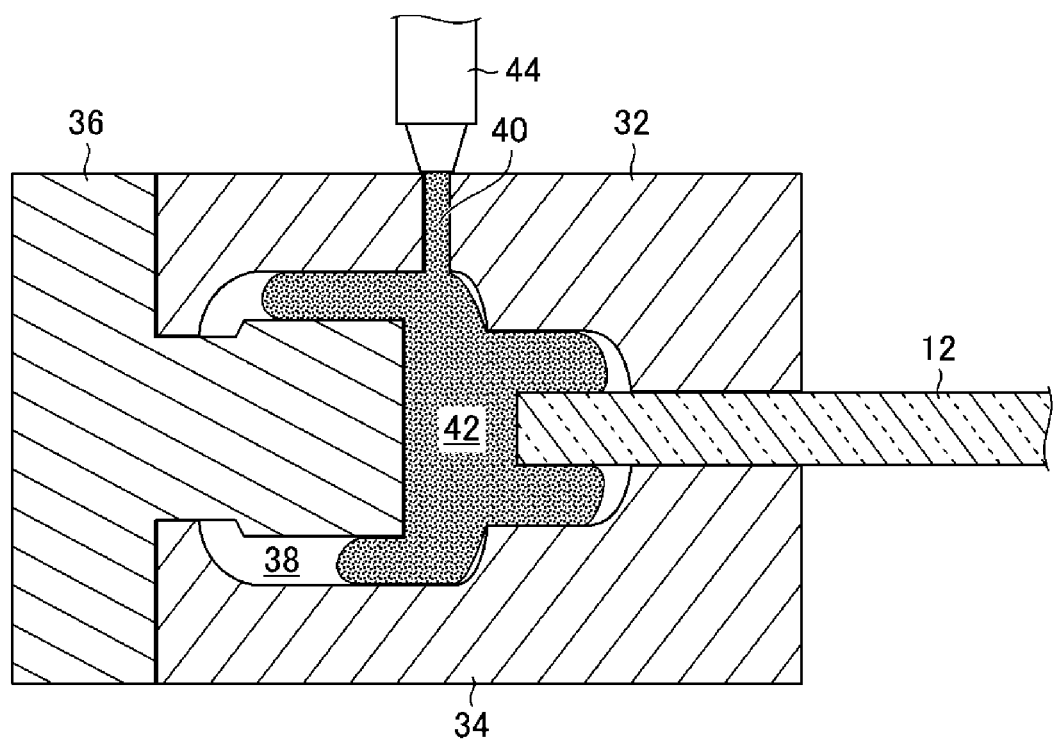
FIG. 9 is a view illustrating a harder portion molding step.

Subsequently, in the harder portion molding step (S30), the molten resin 42 for the harder portion 26 is injected into the cavity space 38 through the gate 40 by an injection cylinder 44 as illustrated in FIG. 9. The cavity space 38 is narrow at a position where the projection formed on either one of the mold parts 32, 34 is present. The buffer portion 30 can be formed with the molten resin 42 being not injected in such an area unlike the remaining areas. Because the molten resin 42 is not also injected into the area occupied by the mold part 36, it is possible to provide the harder portion 26 with the groove 18 of the guide portion 16. Thus, the harder portion 26, the buffer portion 30 and the guide portion 16 are formed on the peripheral edge portion of the fixed window glass 12. After that, the mold parts 32 and 34 are released from the fixed window glass 12 in the primary mold releasing step (S40).

On the other hand, the second forming process includes a secondary mold setting step (S50) of setting a secondary mold for the softer portion to the fixed window glass 12, a softer portion molding step (S60) of injecting a molten resin for the softer portion into the secondary mold, and a secondary mold releasing step (S70) of releasing the secondary mold from the fixed window glass 12 in the order of steps.

Figure 10:
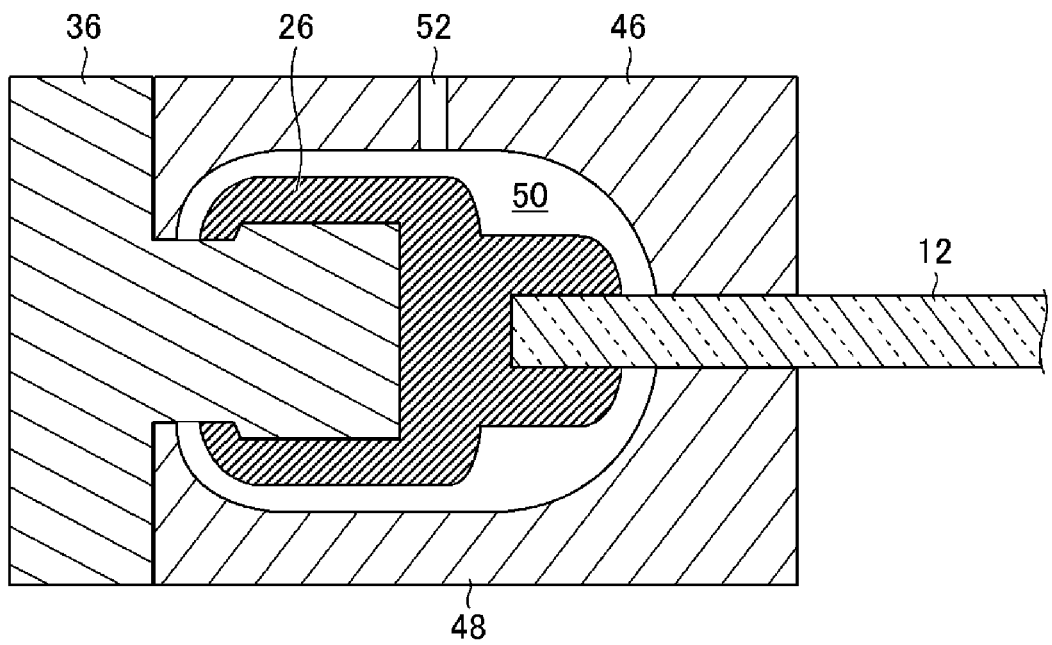
FIG. 10 is a view illustrating a secondary mold setting step.

In FIG. 10 is illustrated a cross-sectional view wherein mold parts 46 and 48 forming the secondary mold are set at equipping positions with respect to the fixed window glass 12 for molding the resin frame 14. As illustrated in FIG. 10, a cavity space 50 is defined by inner wall surfaces of the mold parts 36, 46 and 48 for forming the softer portion 28. The mold part 46 has a gate 52 formed therein to inject the molten resin for the softer portion 28 into the cavity space 50. Although FIG. 10 illustrates an example where the mold parts 36, 46 and 48 form the secondary mold, the structural example of the secondary mold is not limited to one illustrated in FIG. 10.

Figure 11:
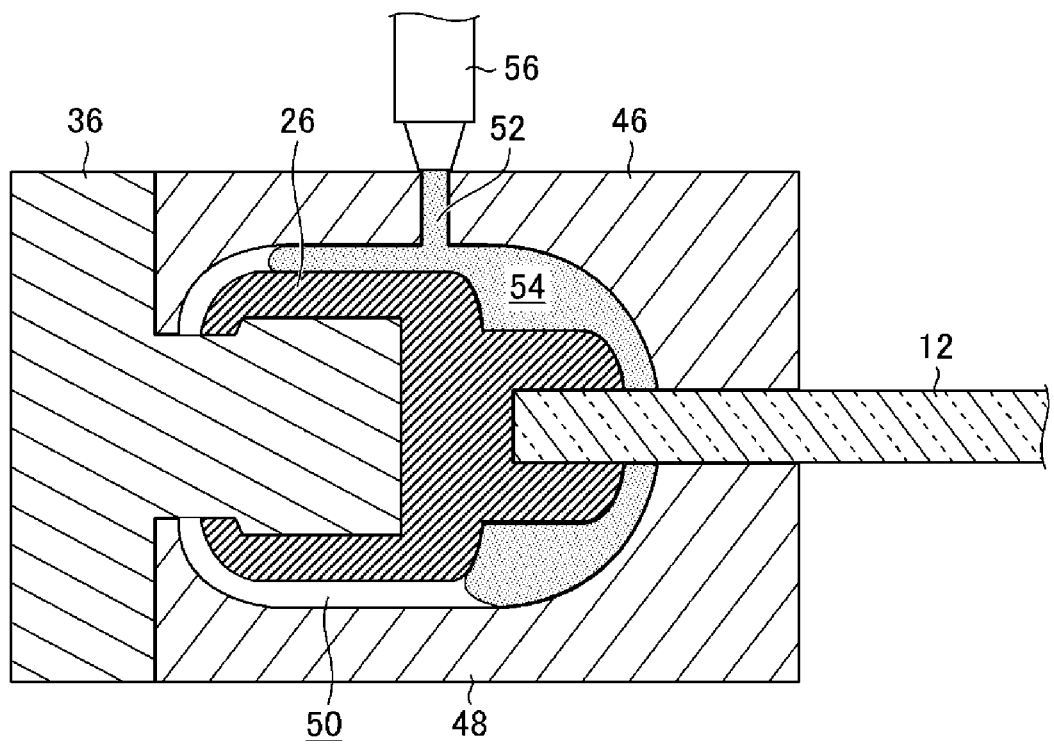
FIG. 11 is a view illustrating a softer portion molding step.

Subsequently, in the softer portion molding step (S60), the molten resin 54 for the softer portion 28 is injected into the cavity space 50 through the gate 52 by an injection cylinder 56 as illustrated in FIG. 11. Thus, the softer portion 28 is integrally formed on an exterior side of the harder portion 26. After that, the mold parts 36, 46 and 48 are released from the fixed window glass 12 in the secondary mold releasing step (S70). Thus, the resin frame 14 as a two-color molded product formed of the harder portion 26 and the softer portion 28 can be attached to the peripheral edge portion of the fixed window glass 12.

In this embodiment, the harder portion 26 and the softer portion 28 are preferred to be made of a similar material. For example, the molten resin 42 for the harder portion is made of PP containing glass fibers while the molten resin 54 for the softer portion is made of PP containing no glass fibers. Thus, the molten resin 54 of PP is heat-fused to the exterior side of the harder portion 26 made of PP in an excellent way. It is possible to configure the resin frame 14 in a stable shape with high dimensional accuracy. The content of the above-mentioned glass fibers may be set according to the hardness required to the harder portion 26. The content is preferred to be set to 30% to 40% for example. Carbon fibers, instead of glass fibers, may be contained in PP.

In accordance with the manufacturing process of this embodiment, it is possible to perform the steps of S10 to S70 in several minutes since the process is carried out by two-color molding. Thus, the resin frame 14 can be attached to the fixed window glass 12 in a short period of time.

In the manufacturing process according to this embodiment, when the first forming process and the second forming process are performed as described below, it is possible to further reduce the period of time required for manufacturing the fixed window glass assembly with the resin frame 10.

In the first forming process, the mold parts 32 and 34 are preliminarily heated up to the temperature of the molten resin 42 as a pretreatment of the harder portion molding step (S30), followed by performing the harder portion molding step (S30). Then, immediately after completion of the harder portion molding step (S30), the mold parts 32 and 34 are quenched by a coolant. Thus, it is possible to mold the harder portion 26 in a short period of time. Likewise, in the second forming process, the mold parts 46 and 48 are preliminarily heated up to the temperature of the molten resin 54 as a pretreatment of the softer portion molding step (S60), followed by performing the softer portion molding step (S60). Then, immediately after completion of the softer portion molding step (S60), the mold parts 46 and 48 are quenched by a coolant. Thus, it is possible to mold the softer portion 28 in a short period of time. In this manner, the primary mold and the secondary mold can be heated and cooled at certain times to reduce the period of time required for molding the resin frame 14. Thus, it is possible to further reduce the period of time required for manufacturing the fixed window glass assembly with the resin frame 10.

Although the embodiment has been explained about a case where the fixed window glass 12 is a single glass plate, the fixed window glass is not limited to be such a glass plate and may be, for example, laminated glass.

As the fixed window glass 12, not only non-tempered glass but also tempered glass is also applicable. The tempered glass may be either glass tempered by air quenching or chemically tempered glass. When tempered glass is applied to the single glass plate, the single glass may have a scattering prevention film bonded to a surface in order to prevent glass pieces from scattering when broken. On the other hand, when tempered glass is applied to a glass plate formed of laminated glass, no scattering prevention film is required since the function of a scattering prevention film is borne by a known interlayer. The interlayer of laminated glass may be, for example, a known film made of PVB (:polyvinyl butyral) or EVA (ethylene-vinyl acetate copolymer).

EXPLANATION OF REFERENCE SYMBOLS

10: Fixed window glass with a resin frame, 12: Fixed window glass, 12A: Horizontal portion, 12B: Vertical portion, 12C: Hypotenuse portion, 12D: First surface, 12E: Second surface, 14: Resin frame, 16: Guide portion, 18: Channel, 26: Harder portion, 28: Softer portion, 30: Buffer portion, 32, 34 and 36: Mold parts, 38: Cavity space, 40: Gate, 42: Molten resin, 44: Injection cylinder, 46 and 48: Mold parts, 50: Cavity space, 52: Gate, 54: Molten resin, 56: Injection cylinder, 100: Rear side door, 110: Vehicle body, 120: Door panel, 130: Elevating window glass

What is claimed is:

1. A fixed window glass assembly with a resin frame, wherein the resin frame is attached to a peripheral edge portion of a fixed window glass to be mounted to a vehicle and has a guide portion for guiding an elevating window glass, comprising:
    the resin frame being formed of an integrally molded product including a harder portion and a softer portion covering the harder portion, the harder portion being formed in a U-character shape in a cross-section, which is perpendicular to a surface of the fixed window glass and an edge of the fixed window glass, to wrap the peripheral edge portion of the fixed window glass in a thickness direction thereof; and
    the resin frame comprises (a) a buffer portion at a part of the peripheral edge portion of the fixed window glass to buffer stresses to be generated between the fixed window glass and the resin frame; (b) a first non-buffer portion adjacent to a first edge of the buffer portion and (c) a second non-buffer portion adjacent to a second edge of the buffer portion, the second edge of the buffer portion is opposite to the first edge of the buffer portion in a direction parallel to the surface of the fixed window glass, wherein a combined thickness perpendicular to the surface of the fixed window glass of the harder portion and the softer portion is the same for the buffer portion, the first non-buffer portion and the second non-buffer portion and a thickness perpendicular to the surface of the fixed window glass of the softer portion at the buffer portion is greater than a thickness perpendicular to the surface of the fixed window glass of the softer portion at the first non-buffer portion and the second non-buffer portion.

2. The fixed window glass assembly with a resin frame according to claim 1, wherein the buffer portion is disposed on an interior side of the fixed window glass.

3. The fixed window glass assembly with a resin frame according to claim 1, wherein the buffer portion comprises a portion of the harder portion.

4. The fixed window glass assembly with a resin frame according to claim 1, wherein a part of the softer portion at the buffer portion, which part extends beyond the thickness of the softer portion in the first non-buffer portion and the second non-buffer portion, has a trapezoidal, rectangular or triangular shape in a cross-section, which is perpendicular to the surface of the fixed window glass.

5. The fixed window glass assembly with a resin frame according to claim 1, wherein the guide portion comprises a channel, the channel being disposed on a side of the harder portion opposite to the fixed window glass, extending along a lifting or lowering direction of the elevating window glass and being formed in a U-character shape in section.

6. The fixed window glass assembly with a resin frame according to claim 1, wherein the softer portion comprises a thermoplastic elastomer, and the harder portion comprises a thermoplastic elastomer containing fibers.

7. The fixed window glass assembly with a resin frame according to claim 1, wherein the harder portion and the softer portion comprise a main material common thereto.

8. The fixed window glass assembly with a resin frame according to claim 7, wherein the main material comprises polypropylene or polyvinyl chloride.

9. The fixed window glass assembly with a resin frame according to claim 1, wherein the resin frame comprises a two-color molded product formed of the softer portion and the harder portion.

10. The fixed window glass assembly with a resin frame according to claim 1, wherein the harder portion has a hardness of 70 to 130 in Rockwell hardness, and the softer portion has a hardness of 50 to 98 in Type A according to JIS K6253.

11. The fixed window glass assembly with a resin frame according to claim 1, further comprising a primer layer between the harder portion and the peripheral edge portion of the fixed window glass.

12. The fixed window glass assembly with a resin frame according to claim 1, wherein the fixed window glass comprises a single glass plate or laminated glass.

13. The fixed window glass assembly with a resin frame according to claim 1, wherein the thickness of the softer portion at the buffer portion is the same as the combined thickness of the harder portion and the softer portion for the first non-buffer portion and the second non-buffer portion.

14. A process for manufacturing a fixed window glass assembly with a resin frame, the resin frame being integrally molded to a peripheral edge portion of a fixed window glass and including a guide portion for guiding an elevating window glass, comprising:
    forming a harder portion having a U-character shape in a cross-section, which is perpendicular to a surface of the fixed window glass and an edge of the fixed window glass, to wrap the peripheral edge portion of the fixed window glass in a thickness direction thereof; and
    forming a softer portion having a U-character shape in the cross-section, which is perpendicular to the surface of the fixed window glass and an edge of the fixed window glass, so as to cover the harder portion, wherein the harder portion and the softer portion are formed in a such way so that the resin frame comprises (a) a buffer portion at a part of the peripheral edge portion of the fixed window glass to buffer stresses to be generated between the fixed window glass and the resin frame; (b) a first non-buffer portion adjacent to a first edge of the buffer portion and (c) a second non-buffer portion adjacent to a second edge of the buffer portion, the second edge of the buffer portion is opposite to the first edge of the buffer portion in a direction parallel to the surface of the fixed window glass, wherein a combined thickness perpendicular to the surface of the fixed window glass of the harder portion and the softer portion is the same for the buffer portion, the first non-buffer portion and the second non-buffer portion and a thickness perpendicular to the surface of the fixed window glass of the softer portion at the buffer portion is greater than a thickness perpendicular to the surface of the fixed window glass of the softer portion at the first non-buffer portion and the second non-buffer portion.

15. The process for manufacturing a fixed window glass assembly with a resin frame according to claim 14, wherein the forming the harder portion comprises applying a primer, then setting a primary mold for the harder portion to the fixed window glass, then injecting a molten resin for the harder portion into the primary mold, and then releasing the primary mold from the fixed window glass.

16. The process for manufacturing a fixed window glass assembly with a resin frame according to claim 14, wherein the forming the softer portion comprises setting a secondary mold for the softer portion to the fixed window glass, then injecting a molten resin for the softer portion into the secondary mold, and then releasing the secondary mold from the fixed window glass.

* * * * *